(12) United States Patent
Yan et al.

(10) Patent No.: US 12,175,640 B2
(45) Date of Patent: Dec. 24, 2024

(54) IMAGE OPTIMIZATION METHOD AND APPARATUS, COMPUTER STORAGE MEDIUM, AND ELECTRONIC DEVICE

(71) Applicant: Tencent Technology (Shenzhen) Company Limited, Shenzhen (CN)

(72) Inventors: Yuxuan Yan, Shenzhen (CN); Pei Cheng, Shenzhen (CN); Gang Yu, Shenzhen (CN); Bin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 340 days.

(21) Appl. No.: 17/735,948

(22) Filed: May 3, 2022

(65) Prior Publication Data
US 2022/0261968 A1 Aug. 18, 2022

Related U.S. Application Data

(63) Continuation of application No. PCT/CN2021/096024, filed on May 26, 2021.

(30) Foreign Application Priority Data

Jun. 28, 2020 (CN) .......................... 202010595618.2

(51) Int. Cl.
*G06T 5/00* (2024.01)
*G06T 5/20* (2006.01)
(Continued)

(52) U.S. Cl.
CPC ................. *G06T 5/73* (2024.01); *G06T 5/20* (2013.01); *G06T 5/70* (2024.01); *G06T 2207/20081* (2013.01); *G06T 2207/20084* (2013.01)

(58) Field of Classification Search
CPC .... G06T 5/73; G06T 5/70; G06T 5/20; G06T 2207/20081; G06T 2207/20084
See application file for complete search history.

(56) References Cited

U.S. PATENT DOCUMENTS

| 10,284,432 B1 | 5/2019 | Kuo et al. |
| 2018/0365874 A1 | 12/2018 | Hadap et al. |

(Continued)

FOREIGN PATENT DOCUMENTS

| CN | 104318603 A | 1/2015 |
| CN | 107103590 A | 8/2017 |

(Continued)

OTHER PUBLICATIONS

Lu Liu et al, "Component Semantic Prior Guided Generative Adversarial Network for Face Super-Resolution", 2019, IEEE Access, 7, pp. 77027-77036 (10 pages) (Year: 2019).*

(Continued)

*Primary Examiner* — David F Dunphy
(74) *Attorney, Agent, or Firm* — Morgan, Lewis & Bockius LLP

(57) ABSTRACT

A computing device obtains a to-be-optimized image. The device aligns the to-be-optimized image to obtain a to-be-optimized aligned image. The to-be-optimized aligned image includes a target region having points of objects that are distributed in a standard position. The computing device uses the to-be-optimized aligned image as an inputs to a generation network. The device performs feature extraction on the to-be-optimized aligned image using the generation network, to obtain an optimized image. The generation network is obtained by training a to-be-trained generative adversarial deep neural network model according to a low-quality image pair and a joint loss function. The low-quality (Continued)

image pair includes a target image and a low-quality image corresponding to the target image.

20 Claims, 14 Drawing Sheets

(51) Int. Cl.
*G06T 5/70* (2024.01)
*G06T 5/73* (2024.01)

(56) References Cited

U.S. PATENT DOCUMENTS

| | | |
|---|---|---|
| 2019/0114748 A1 | 4/2019 | Lin et al. |
| 2019/0252073 A1 | 8/2019 | Hsu et al. |
| 2019/0295302 A1 | 9/2019 | Fu et al. |

FOREIGN PATENT DOCUMENTS

| | | |
|---|---|---|
| CN | 107481188 A | 12/2017 |
| CN | 108520503 A | 9/2018 |
| CN | 108537743 A | 9/2018 |
| CN | 109376582 A | 2/2019 |
| CN | 109615582 A | 4/2019 |
| CN | 109685072 A | 4/2019 |
| CN | 110349102 A | 10/2019 |
| CN | 110363116 A | 10/2019 |
| CN | 110472566 A | 11/2019 |
| CN | 109685724 B | 4/2020 |
| CN | 111080527 A | 4/2020 |
| CN | 111126307 A | 5/2020 |
| CN | 111488865 A | 8/2020 |
| JP | 2010239337 A | 10/2010 |
| JP | 2020010331 A | 1/2020 |

OTHER PUBLICATIONS

Tencent Technology, WO, PCT/CN2021/096024, Aug. 23, 2021, 4 pgs.
Tencent Technology, IPRP, PCT/CN2021/096024, Dec. 13, 2022, 5 pgs.
Tencent Technology, India Office Action, IN Patent Application No. 202237036773, Feb. 16, 2023, 7 pgs.
Tencent Technology, ISR, PCT/CN2021/096024, Aug. 23, 2021, 2 pgs.
Boyu Lu et al., "UID-GAN: Unsupervised Image Deblurring via Disentangled Representations", IEEE Transactions on Biometrics, Behavior, and Identity Science, IEEE, vol. 2, No. 1, Dec. 16, 2019, XP11768655, 14 pgs.
Tao Lu et al., "Parallel Region-Based Deep Residual Networks for Face Hallucination", IEEE Access, vol. 7, XP11732784, 13 pgs.
Tencent Technology, Extended European Search Report and Supplementary Search Report, EP21832144.6, Nov. 29, 2022, 10 pgs.
Brandon Amos et al., "OpenFace: A General-Purpose Face Recognition Library with Mobile Applications", School of Computer Science, Carnegie Mellon University, Jun. 2016, 20 pgs.
Rajeev Ranjan et al., "An All-In-One Convolutional Neural Network for Face Analysis", 2017 IEEE 12th International Conference on Automatic Face & Gesture Recognition, 2017, 8 pgs.
Suhail Hamdan et al., "Example-based Face-Image Restoration for Block-noise Reduction", Dec. 8, 2017, 2017 IEE, Japan, 7 pgs.
Tencent Technology, Japanese Office Action, JP Patent Application No. 2022-552468, Sep. 4, 2023, 10 pgs.
Xianjun Han et al., "Asymmetric Joint GANs for Normalizing Face Illumination From a Single Image", IEEE Transactions on Multimedia, Jun. 2020, vol. 22, No. 6, 16 pgs.

* cited by examiner

IMAGE OPTIMIZATION METHOD AND APPARATUS, COMPUTER STORAGE MEDIUM, AND ELECTRONIC DEVICE

CROSS-REFERENCE TO RELATED APPLICATIONS

This application is a continuation application of PCT Patent Application No. PCT/CN2021/096024, entitled "IMAGE OPTIMIZATION METHOD AND APPARATUS, COMPUTER STORAGE MEDIUM, AND ELECTRONIC DEVICE" filed on May 26, 2021, which claims priority to Chinese Patent Application No. 202010595618.2, filed with the State Intellectual Property Office of the People's Republic of China on Jun. 28, 2020, and entitled "IMAGE OPTIMIZATION METHOD AND APPARATUS, COMPUTER STORAGE MEDIUM, AND ELECTRONIC DEVICE", all of which are incorporated herein by reference in their entirety.

FIELD OF THE TECHNOLOGY

This application relates to the field of artificial intelligence technologies, and specifically, to an image optimization technology.

BACKGROUND OF THE DISCLOSURE

In processes of imaging, transmission, and obtaining an image, the image is inevitably affected by external interference and an imperfect transmission device, causing more noise in the image, and the image is blurred due to the loss of original details. In order to restore the original details of the image, the image needs to be optimized.

Currently, three methods are usually adopted to optimize the image. The first method is to repair the noise and blur of the image through one or more image filtering methods. The second method is to optimize the image through a neural network. The third method is to perform image super-resolution through the neural network to optimize the image. However, the foregoing three methods have the problem of a poor denoising effect, a poor sharpening effect, or adding details that do not conform to the original image to the image, which affects user experience.

The information disclosed in the above background part is only used for enhancing the understanding of the background of this application.

SUMMARY

This application provides an image optimization method and apparatus, a computer-readable storage medium, and an electronic device (e.g., a computing device), to optimize an image at least to some extent, improve image quality, thereby further improving user experience.

Other features and advantages of this application become obvious through the following detailed descriptions, or may be partially learned through the practice of this application.

According to an aspect of this application, an image optimization method is provided, including: obtaining a to-be-optimized image; aligning the to-be-optimized image to obtain a to-be-optimized aligned image, the to-be-optimized aligned image includes a target region having points of objects that are distributed in a standard position; using the to-be-optimized aligned image as an input to a generation network, performing feature extraction on the to-be-optimized aligned image through the generation network, to obtain an optimized image, the generation network is obtained by training a to-be-trained generative adversarial deep neural network model according to a low-quality image pair and a joint loss function, and the low-quality image pair including a target image and a low-quality image corresponding to the target image.

According to an aspect of this application, an image optimization apparatus is provided, including: an obtaining module, configured to obtain a to-be-optimized image; an alignment module, configured to align the to-be-optimized image to obtain a to-be-optimized aligned image, points of objects in a target region of the to-be-optimized aligned image being distributed in a standard position; and an optimization module, configured to input the to-be-optimized aligned image to a generation network, and perform feature extraction on the to-be-optimized aligned image through the generation network, to obtain an optimized image, the generation network being obtained by training a to-be-trained generative adversarial deep neural network model according to a low-quality image pair and a joint loss function, and the low-quality image pair including a target image and a low-quality image corresponding to the target image.

According to an aspect of this application, a computer storage medium is provided, storing a computer program, the computer program, when executed by a processor, implementing the image optimization method according to the foregoing first aspect.

According to an aspect of this application, an electronic device for image optimization is provided, including: a processor; and a memory, configured to store executable instructions of the processor, the processor being configured to perform the image optimization method according to the foregoing first aspect by executing the executable instructions.

According to an aspect of this application, a computer program product is provided, the computer program product, when executed, configured to perform the image optimization method according to the foregoing first aspect.

BRIEF DESCRIPTION OF THE DRAWINGS

Accompanying drawings herein are incorporated into this specification and constitute a part of this specification, show embodiments that conform to this application, and are used for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings.

DESCRIPTION OF EMBODIMENTS

Figure 1:
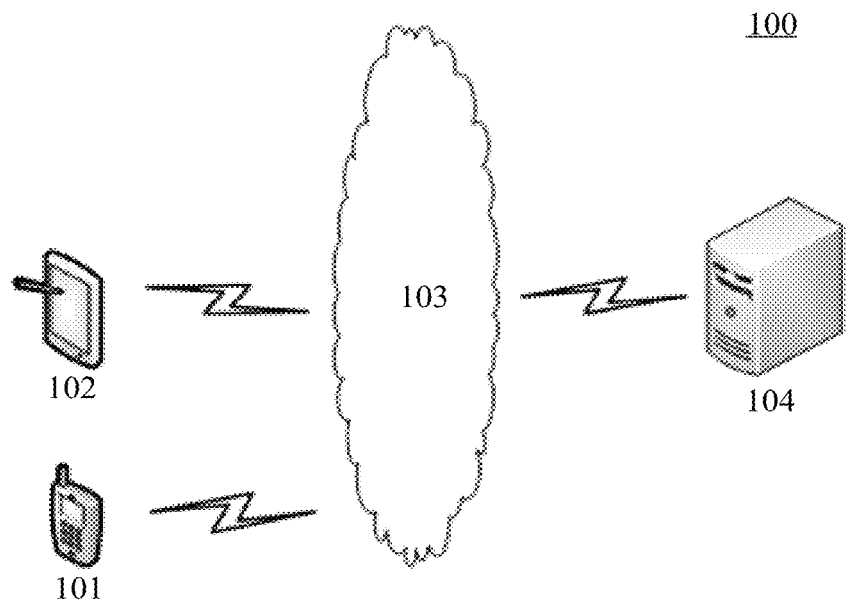
FIG. 1 is a schematic diagram of an exemplary system architecture to which the technical solutions according to the embodiments of this application are applicable.

FIG. 1 is a schematic diagram of an exemplary system architecture to which the technical solutions according to the embodiments of this application are applicable.

As shown in FIG. 1, the system architecture 100 may include a mobile terminal 101, an information transmission terminal 102, a network 103, and a server 104. The mobile terminal 101 may be a terminal device having a camera and a display screen, such as a mobile phone, a portable computer, or a tablet computer. The information transmission terminal 102 may be an intelligent terminal, such as an intelligent electronic device equipped with various operating systems. The network 103 is a medium used for providing a communication link between the mobile terminal 101 and the server 104, and between the information transmission terminal 102 and the server 104. The network 103 may include various connection types, such as a wired communication link and a wireless communication link. In the embodiments of this application, the network 103 between the mobile terminal 101 and the information transmission terminal 102 may provide the communication link through a wireless network. The network 103 between the mobile terminal 101 and the server 104, and the network 103 between the information transmission terminal 102 and the server 104 may be wireless communication links, and specifically, may be mobile networks.

It is to be understood that the number of terminals (such as the mobile terminals 101 and the information transmission terminals 102), networks, and servers in FIG. 1 are merely illustrative. There may be any number of terminals, networks, and servers according to an implementation requirement. For example, the server 104 may be a server cluster including a plurality of servers, and may be configured to store information related to image optimization.

In an embodiment of this application, after obtaining a to-be-optimized image, the mobile terminal 101 transmits the to-be-optimized image to the server 104. The server 104 aligns the to-be-optimized image to obtain a to-be-optimized aligned image corresponding to the to-be-optimized image. The server 104 inputs the to-be-optimized aligned image to a generation network, performs feature extraction on the to-be-optimized aligned image through the generation network to obtain an optimized image, and returns the optimized image to the mobile terminal 101. The generation network is obtained by training a to-be-trained generative adversarial deep neural network model according to a low-quality image pair and a joint loss function. The low-quality image pair includes a target image and a low-quality image corresponding to the target image.

In an embodiment of this application, after obtaining a to-be-optimized image, the mobile terminal 101 transmits the to-be-optimized image to the information transmission terminal 102. The information transmission terminal 102 aligns the to-be-optimized image to obtain a to-be-optimized aligned image corresponding to the to-be-optimized image, and then transmits the to-be-optimized aligned image to the server 104. The server 104 inputs the to-be-optimized aligned image to a generation network, performs feature extraction on the to-be-optimized aligned image through the generation network, to obtain an optimized image, and returns the optimized image to the information transmission terminal 102. Further, the information transmission terminal 102 returns the optimized image to the mobile terminal 101. The generation network is obtained by training a to-be-trained generative adversarial deep neural network model according to a low-quality image pair and a joint loss function. The low-quality image pair includes a target image and a low-quality image corresponding to the target image.

In an embodiment of this application, after obtaining a to-be-optimized image, the mobile terminal 101 aligns the to-be-optimized image to obtain a to-be-optimized aligned image corresponding to the to-be-optimized image, and then transmits the to-be-optimized aligned image to the server 104. The server 104 inputs the to-be-optimized aligned image to a generation network, performs feature extraction on the to-be-optimized aligned image through the generation network, to obtain an optimized image, and returns the optimized image to the mobile terminal 101. The generation network is obtained by training a to-be-trained generative adversarial deep neural network model according to a low-quality image pair and a joint loss function. The low-quality image pair includes a target image and a low-quality image corresponding to the target image.

The image optimization method provided in the embodiments of this application is generally performed by the server 104. Correspondingly, the image optimization apparatus is generally disposed in the server 104. However, in other embodiments of this application, the terminal may alternatively have functions similar to those of the server, thereby performing the image optimization solution provided in the embodiments of this application.

In the related art in this field, when the low-quality image is optimized, three types of optimization methods are usually adopted. A first method is to deblur the image through image processing, which reduces image noise and blur using one or more image filtering methods. A second method is to sharpen the image using a neural network. A third method is to perform image super-resolution by using the neural network to sharpen the image.

The foregoing three methods have certain limitations. Processing of the first method is more one-sided than that of the neural network. Because the first method cannot fully fit noise and blur distribution in reality, the first method cannot achieve a good denoising effect. The second method mainly focuses on an image sharpening method of a general scene, and the low-quality image methods used are uneven. If a combination used in a process of the low-quality image is not rich enough, the neural network cannot well fit distribution of a real blurred image. Consequently, the generated image is not well sharpened. In addition, for images of different sizes, no normalization is performed, which also causes a poor result due to different sizes of regions when a related image is processed. For the third method, while the image is sharpened, some details that do not conform to the original image are brought to the image. For example, the noise is converted into clear details. The method mainly focuses on super resolution of any image. There is no separate processing for a specific feature of the image.

In the technical solutions provided in this application, an image optimization model is determined based on training a generative adversarial deep neural network model. The to-be-processed image is optimized through the image optimization model. According to the technical solutions provided in this application, processing such as denoising, sharpening, and generating details, allows that the low-quality image can maintain the feature of the original image, and can be clearer, with higher image quality and better user experience. In addition, the technical solutions of this application have low costs of processing images and a wide application range.

The generative adversarial deep neural network model is a type of a neural network model. Compared with a conventional neural network model, a main feature of the generative adversarial deep neural network model is that the generative adversarial deep neural network model has a discrimination network structure in addition to a generation network structure. The generation network is used for generating an image, while the discrimination network is used for determining whether an image (including the target image and the generated image) is true or false. In a process of training the generative adversarial deep neural network model, iterative training is performed by calculating a difference between the generated image and the target image, and determining an error of the image through the discrimination network. Further, through an adversarial training process of the generation network and the discrimination network, a network parameter of the generation network is optimized, so that the generated image is close to a target requirement. Therefore, the generative adversarial deep neural network model can generate a higher-quality image because the generation network and the discrimination network of the generative adversarial deep neural network model confront each other.

The image optimization method provided in the embodiments of this application is implemented based on the generative adversarial deep neural network model, and relates to the field of artificial intelligence technologies. Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The solutions provided in the embodiments of this application involve an image processing technology and an image recognition technology of AI, and are specifically described by using the following embodiments.

In the embodiments of this application, an image optimization method is provided, to overcome the defects in the related art at least to some extent. The image optimization method provided in this embodiment may be performed by a device having a computing function, such as a server or a terminal device, or may be performed by jointly by a server and a terminal device. The terminal device and the server may be the mobile terminal 101 and the server 104 respectively shown in FIG. 1. The image optimization method of this application may be used for optimizing any low-quality image. For example, the low-quality image such as a human face image, an animal image, or an image of a building with a fixed structure may be processed to restore and improve image details. An example in which the server is the execution entity, and the low-quality image is a human face image is used for describing the image optimization method provided in the embodiments of this application in details.

Figure 2:
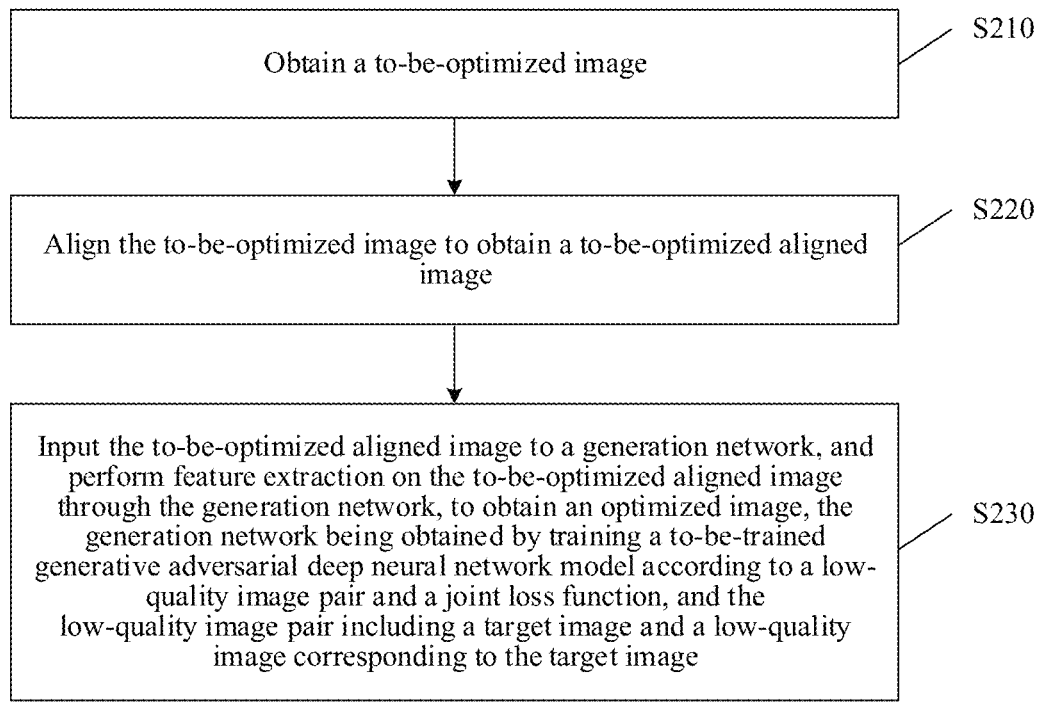
FIG. 2 is a schematic flowchart of an image optimization method according to an exemplary embodiment of this application.

FIG. 2 is a schematic flowchart of an image optimization method according to an exemplary embodiment of this application. Referring to FIG. 2, the image optimization method provided in this embodiment specifically includes the following steps:

In S210, a to-be-optimized image is obtained.

The to-be-optimized image is a low-quality image. Low quality is mainly manifested as poor image definition (e.g., poor image resolution) and high noise. In an embodiment of this application, using an example in which the low-quality image is a human face image, the to-be-optimized image is a low-quality human face image. The low-quality human face image may be an image obtained by a user using a terminal device with a camera and an imaging unit to shoot the face of a target person or a part including the face. The human face in the image may be presented at any angle, as long as facial features of the person can be obtained. The to-be-optimized image may be alternatively an image including a human face downloaded by the user through a network.

In S220, the to-be-optimized image is aligned to obtain a to-be-optimized aligned image.

Before the to-be-optimized image is optimized, it is necessary to correct the to-be-optimized image, so that points of objects in a target region of the to-be-optimized image are distributed in a standard position.

In an embodiment of this application, still using the example in which the to-be-optimized image is a low-quality human face image, before the to-be-optimized image is optimized, it is necessary to correct the angle of the human face in the to-be-optimized image, so that the human face in the image is in a standard frontal human face position (that is, the standard position).

In a possible implementation, a standard position template may be used to correct the human face image. The standard position template is a point distribution of each object in a specific region. Specifically, a standard position template of the human face image is a point distribution of the facial features (e.g., each object corresponds to a facial feature) in a human face region. For example, when the human face is in the standard frontal human face position, point coordinates of the facial features may be obtained according to a large quantity of human face data statistics to form a five-point coordinate template, that is, the standard position template. The five points include two points marking left and right eyes, a point marking the nose tip, and two points marking left and right mouth corners. When the coordinates of the points are calculated, an average value of all coordinate information corresponding to the same part may be used as point coordinates corresponding to the part in the five-point coordinate template. For example, coordinate information corresponding to left eyes in all human face data may be obtained. Then weighted averaging is performed on the coordinate information of all the left eyes to obtain point coordinates of the left eye in the standard position template.

Figure 3:
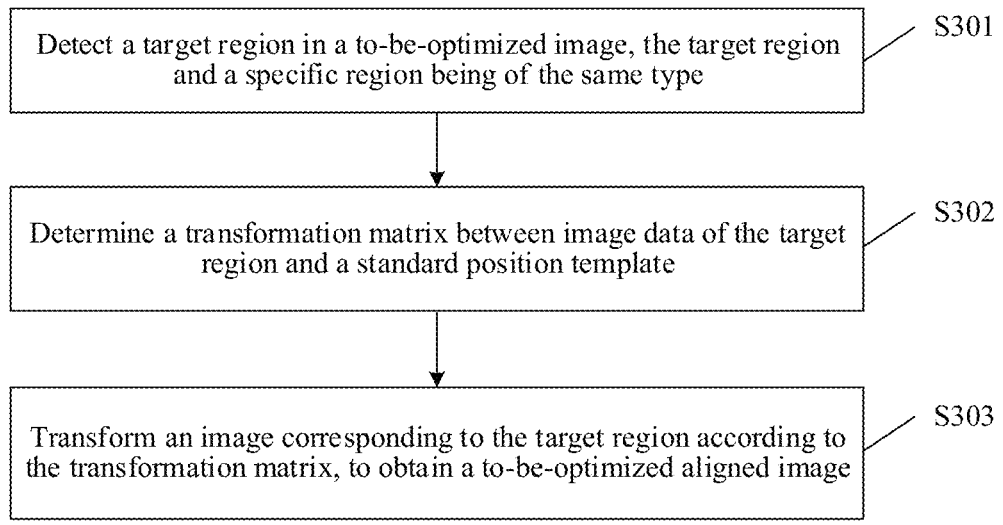
FIG. 3 is a schematic flowchart of obtaining a to-be-optimized aligned image according to an embodiment of this application.

In an embodiment of this application, after the standard position template is determined, the to-be-optimized image may be aligned according to the standard position template. That is, the human face in the to-be-optimized image is corrected to the standard frontal human face position. FIG. 3 is a schematic flowchart of obtaining a to-be-optimized aligned image. As shown in FIG. 3, a procedure of obtaining the to-be-optimized aligned image includes step S301 to step S303:

In S301, a target region in the to-be-optimized image is detected, the target region and the specific region being of the same type.

In an embodiment of this application, because the to-be-optimized image needs to be aligned according to the standard position template, it is necessary to determine the target region in the to-be-optimized image that is of the same type as the specific region corresponding to the standard position template. That is, the objects corresponding to the specific region and the target region are same. For example, both of them are human face regions or animal face regions. For example, if the standard position template is a template corresponding to the human face region, the human face region needs to be extracted from the to-be-optimized image, and then, the human face region is aligned according to the standard position template. In an actual image processing process, in addition to the human face region, the to-be-optimized image may further include another part of the human body. For example, a half-body photo includes a neck and an upper body in addition to the human face region. In order to optimize the human face region, the human face region in the to-be-optimized image needs to be recognized, and then the recognized human face region is optimized. When the human face region in the to-be-optimized image is recognized, a model that may be used for human face recognition may be used, and the human face region is determined by recognizing the facial features. The human face region in the to-be-optimized image needs to be aligned. Therefore, the standard position template used is also a template corresponding to the human face region.

In S302, a transformation matrix between image data of the target region and the standard position template is determined.

In an embodiment of this application, when the human face region in the to-be-optimized image is aligned with the standard position template, the transformation matrix between the two may be determined according to image data corresponding to the human face region and data corresponding to the standard position template. Then, according to the transformation matrix, the human face region in the to-be-optimized image may be corrected into a human face region aligned with the five-point coordinates in the standard position template.

In S303, an image corresponding to the target region is transformed according to the transformation matrix, to obtain the to-be-optimized aligned image.

In an embodiment of this application, after the transformation matrix is obtained, an operation such as translation, rotation, or scaling may be performed on the to-be-optimized image according to the transformation matrix. Then the to-be-optimized image is normalized to a form consistent with the standard frontal human face position, to obtain the to-be-optimized aligned image. Further, the human face alignment may be performed in reverse. That is, an aligned human face may be restored to the original shot human face state through an inverse operation of the transformation matrix.

Figure 4A:
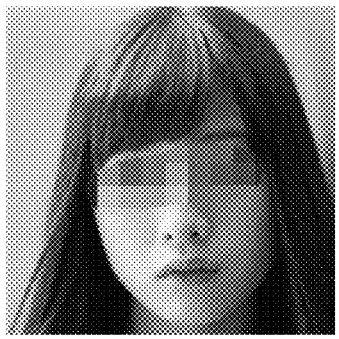
FIGS. 4A to 4C are schematic diagrams of an interface of aligning a human face image according to an embodiment of this application.
Figure 4B:
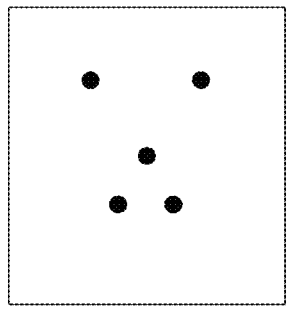
Figure 4C:
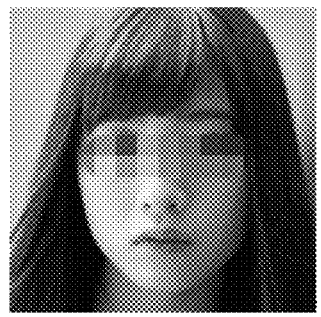

FIG. 4A, FIG. 4B, and FIG. 4C are schematic diagrams of an interface of aligning a human face image. FIG. 4A is a to-be-optimized image. The to-be-optimized image is a low-quality human face image, where a human face region is tilted, and is not a standard frontal human face position. FIG. 4B is a standard position template, that is, five-point coordinates corresponding to the human face image. After the to-be-optimized human face image shown in FIG. 4A is aligned according to the standard position template shown in FIG. 4B, the to-be-optimized aligned human face image as shown in FIG. 4C may be obtained, where the human face region conforms to the standard frontal human face position.

In S230, the to-be-optimized aligned image is input to a generation network, and feature extraction is performed on the to-be-optimized aligned image through the generation network, to obtain an optimized image. The generation network is obtained by training a to-be-trained generative adversarial deep neural network model according to a low-quality image pair and a joint loss function. The low-quality image pair includes a target image and a low-quality image corresponding to the target image.

In an embodiment of this application, after the to-be-optimized aligned image is obtained, the to-be-optimized aligned image may be inputted to the generation network. The feature extraction is performed on the to-be-optimized aligned image through the generation network, to obtain the optimized image. The optimized image is an image obtained by denoising and sharpening the to-be-optimized image to generate facial details.

In an embodiment of this application, the generation network is a part of the generative adversarial deep neural network model, which may generate an optimized image corresponding to the inputted to-be-optimized aligned image. Before the generation network is used to generate the optimized image, the to-be-trained generative adversarial deep neural network model needs to be trained, to obtain a stable generation network.

Figure 5:
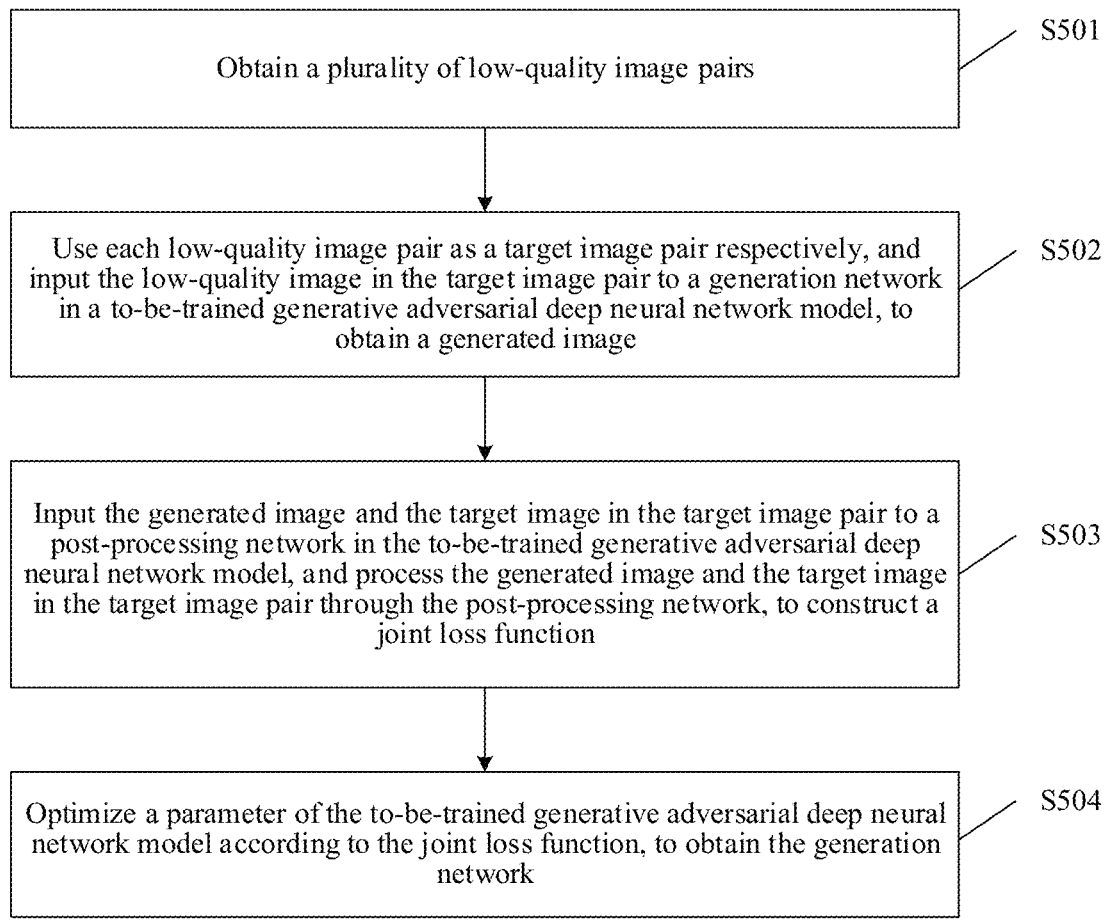
FIG. 5 is a schematic diagram of training a generative adversarial deep neural network model according to an embodiment of this application.

In embodiment of this application, FIG. 5 is a schematic diagram of training a generative adversarial deep neural network model. As shown in FIG. 5, a training procedure of training the generative adversarial deep neural network model specifically includes S501 to S504.

In S501, a plurality of low-quality image pairs are obtained.

In an embodiment of this application, the low-quality image pair may be used as a training sample for training the to-be-trained generative adversarial deep neural network model. The low-quality image is used as an input sample, and a target image corresponding to the low-quality image is a verification sample for determining whether performance of the generation network is stable. That is, the low-quality image in each low-quality image pair is the to-be-optimized image, the target image is an expected optimized image.

Figure 6:
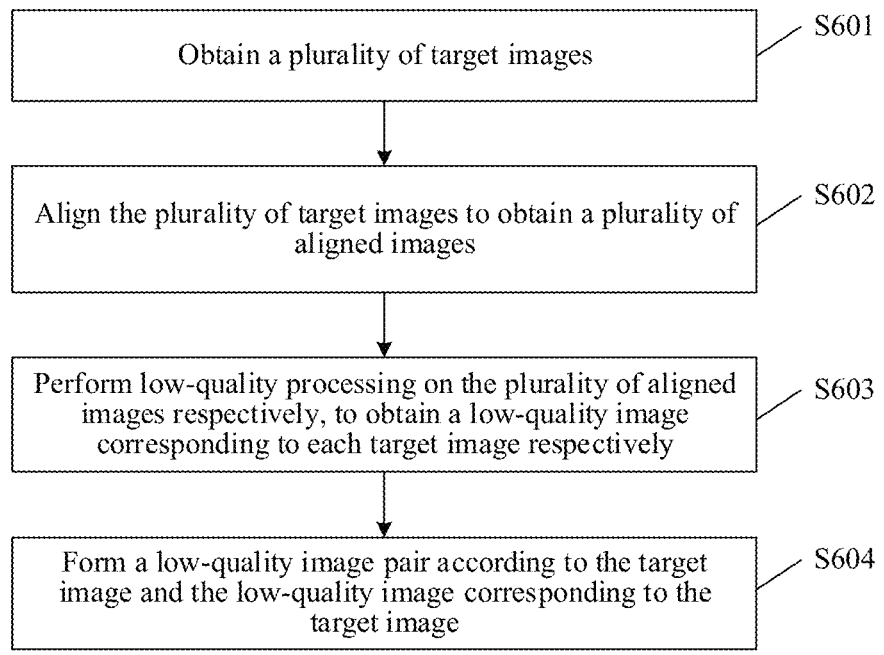
FIG. 6 is a schematic flowchart of obtaining a plurality of low-quality image pairs according to an embodiment of this application.

In an embodiment of this application, FIG. 6 is a schematic flowchart of obtaining a plurality of low-quality image pairs. As shown in FIG. 6, the procedure specifically includes S601 to S604:

In S601, a plurality of target images are obtained.

In S602, the plurality of target images are aligned respectively to obtain a plurality of aligned images.

In an embodiment of this application, a large quantity of clear images may be pre-obtained as target images. The specific quantity may be determined according to an actual requirement. A larger quantity indicates higher performance of the model. For example, the quantity such as 10,000, 20,000, or 100,000 of the clear images with a human face may be collected as the target images. After the target images are obtained, the human face regions in the target images are aligned to obtain aligned images. During aligning, the human face regions in the target images may be aligned according to the standard position template. For example, the human face regions in the target image may be detected first, then point coordinates of facial features in the human face regions are extracted, and finally, the extracted point coordinates of the facial features are aligned with point coordinates of the facial features in the standard position template, to obtain the plurality of aligned images.

In S603, image processing (e.g., low-quality processing) is performed on the plurality of aligned images respectively, to obtain the low-quality image corresponding to each target image respectively.

In S604, the low-quality image pair is formed according to the target image and the low-quality image corresponding to the target image.

In an embodiment of this application, the low-quality image may be formed by processing each aligned image to reduce (e.g., decrease, lower) the quality of the image. For example, the image processing may include noise addition and/or blurring. The noise addition includes adding one or more of Gaussian noise, Poisson noise, and salt-and-pepper noise. The blurring includes one or more of mean filtering, Gaussian filtering, median filtering, bilateral filtering, and resolution reduction. Certainly, a noise type and a blurring manner added in the embodiments of this application are not limited to the foregoing types, and other types of noise and/or blurring manners may be included. Details are not described herein again in this application.

Various types of noise and the blurring manners are described below.

A probability density of the Gaussian noise obeys Gaussian distribution. An expression of the Gaussian distribution is shown in formula (1):

$$f(x) = \frac{1}{\sqrt{2\pi}\sigma}\exp\left(-\frac{(x-\mu)^2}{2\sigma^2}\right) \quad (1)$$

$\mu$ represents a mean of the distribution, $\sigma$ represents a standard deviation of the distribution, and $\sigma^2$ represents a variance of the distribution. In the embodiments of this application, $\mu$ and $\sigma$ may be determined randomly. After the parameter is determined, the noise is added to a color value of each pixel in the image according to the probability distribution. Finally, the color value of the pixel is scaled to (0, 255) to add the Gaussian noise.

A probability density of the Poisson noise obeys Poisson distribution. An expression of the Poisson distribution is shown in formula (2):

$$P(X=k) = \frac{e^{-\lambda}\lambda^k}{k!} \quad (2)$$

The parameter $\lambda$ may be determined randomly. After the parameter is determined, the color value of each pixel in the image may be processed according to the probability distribution of the Poisson noise, to add the Poisson noise.

The salt-and-pepper noise is to randomly add black and white pixels to the image. A quantity of the black and white pixels may be controlled by a signal-to-noise ratio, and the signal-to-noise ratio may be determined randomly. After the signal-to-noise ratio is determined, a total quantity of the pixels may be determined according to the signal-to-noise ratio. Then a position of the pixel to which noise needs to be added is obtained randomly in the image region corresponding to the total quantity of the pixels, and a pixel value at the position is set to 255 or 0. Finally the foregoing steps are repeated for other pixels in the image region, to add the salt-and-pepper noise to the image.

The mean filtering is to average a target pixel and surrounding pixels, and then fill the average value to the target pixel. An expression of the mean filtering is shown in formula (3):

$$g(x, y) = \frac{1}{M}\sum_{f \in s} f(x, y) \quad (3)$$

M represents a size of a coefficient template, f(x, y) represents pixel values of the target pixel in the image and the surrounding pixels corresponding to M, s represents all the pixels in the image, and g(x, y) represents a pixel value after the mean filtering is performed on the target pixel. For example, if the size of the coefficient template is 3×3, M is equal to 9. Therefore, the pixel values of the target pixel and the surrounding 8 pixels may be averaged. The average value may be filled to the target pixel, to blur the image.

The Gaussian filtering uses a normal distribution to calculate transformation of each pixel in the image. An expression of the Gaussian filtering is shown in formula (4):

$$G(u, v) = \frac{1}{2\pi\sigma^2}e^{-(u^2+v^2)/(2\sigma^2)} \quad (4)$$

$u^2+v^2$ represents a blur radius, and a size of the blur radius may be determined randomly. After the blur radius and the variance are determined, a color value of each pixel in the image may be transformed according to the normal distribution, to blur the image.

The median filtering is to set the pixel value of each pixel to a median of the pixel values of all the pixel values in a certain neighborhood window of the point. A kernel size of the domain window may be determined randomly.

The bilateral filtering is a different edge-preserving filtering method that considers both a spatial position (a space-domain kernel) and the pixel value (a value-domain kernel), where a kernel size of the spatial position (namely, the radius of the Gaussian filtering) and a size of the value-domain kernel may be determined randomly.

The resolution reduction may reduce image quality by first reducing resolution randomly and then upsampling back to the original resolution. In the embodiments of this application, the degree to which the resolution is reduced may be determined randomly.

In an embodiment of this application, a target image may be determined through a random combination of the foregoing methods, such as a combination of methods for a low-quality human face image, to simulate a real low-quality image. Because the combination is a random combination, and there is a random variable in the low-quality method involved in each combination, effects of each processed target image are not the same. The to-be-trained generative adversarial deep neural network model is trained based on the low-quality image pair formed by the target image and the low-quality image that is obtained after the image processing (e.g., processing to lower image quality) is performed on the target image, which can improve processing precision of the model for various low-quality images.

In S502, each low-quality image pair is used as a target image pair respectively, and a low-quality image in the target image pair is inputted to a generation network in the to-be-trained generative adversarial deep neural network model, to obtain a generated image.

In S503, the generated image and a target image in the target image pair are inputted to a post-processing network in the to-be-trained generative adversarial deep neural network model. The generated image and the target image in the target image pair are processed through the post-processing network, to construct a joint loss function.

In S504, a parameter of the to-be-trained generative adversarial deep neural network model is optimized according to the joint loss function, to obtain the generation network.

Figure 7:
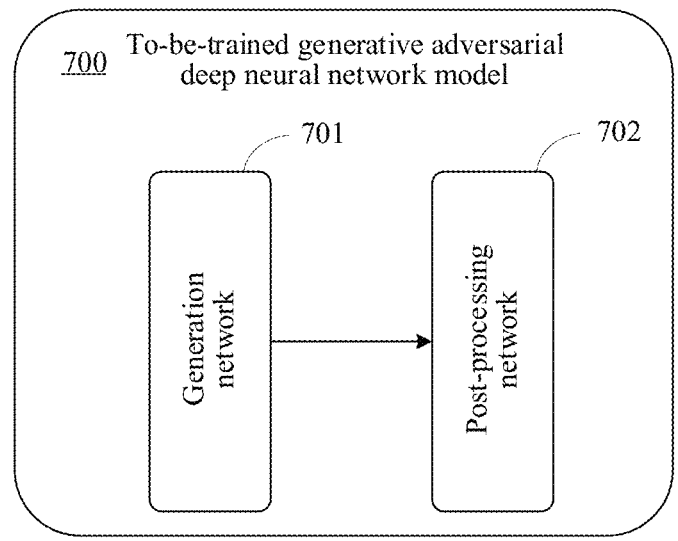
FIG. 7 is a schematic structural diagram of a to-be-trained generative adversarial deep neural network model according to an embodiment of this application.

In an exemplary embodiment, before the training process of the to-be-trained generative adversarial deep neural network model is described, a network structure of the to-be-trained generative adversarial deep neural network model used in this embodiment is described first. FIG. 7 is a schematic structural diagram of a to-be-trained generative adversarial deep neural network model. As shown in FIG. 7, the to-be-trained generative adversarial deep neural network model 700 includes a generation network 701 and a post-processing network 702. The generation network 701 is used for processing an inputted low-quality image, to output a generated image. The post-processing network 702 is used for constructing a joint loss function according to the generated image outputted by the generation network 701 and a target image, and optimizing a parameter of the model based on the joint loss function.

Figure 8:
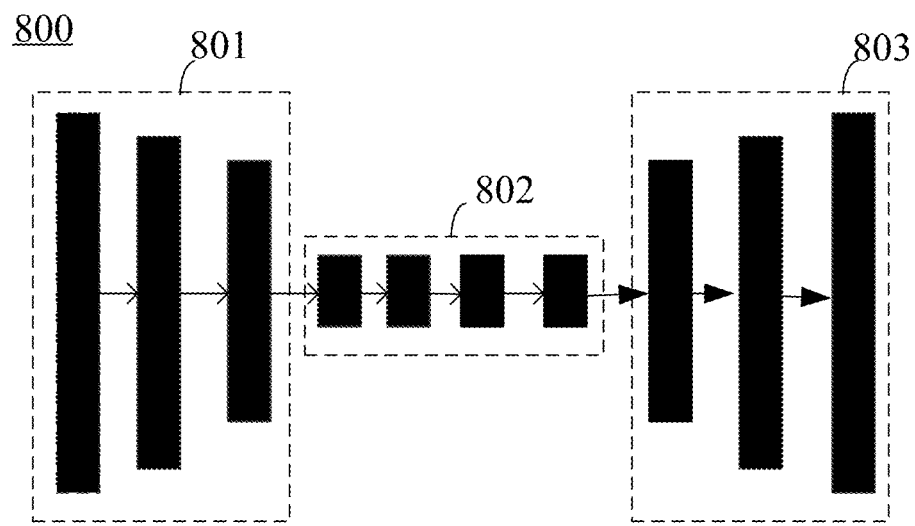
FIG. 8 is a schematic structural diagram of a generation network according to an embodiment of this application.

FIG. 8 is a schematic structural diagram of a generation network. As shown in FIG. 8, the generation network 800 provided in this embodiment includes a downsampling layer 801, a residual network layer 802, and an upsampling layer 803. A quantity of the residual network layers 802 may be set to multiple, for example, 4 or 5. In the embodiments of this application, the downsampling layer 801 may include a plurality of convolutional layers with different sizes. The upsampling layer 803 may also include a plurality of convolutional layers with different sizes. A convolution operation in a downsampling process may be used for extracting a deep feature of the image. However, compared with the inputted image, a plurality of times of the convolution operations make an obtained feature map continuously decrease, resulting in information loss. Therefore, in order to reduce the information loss, after the feature extraction is performed on the residual network layer, a size of the feature map may be restored to the size of the inputted image through upsampling, which can reduce the loss of original information during a network transmission process, thereby alleviating structure inconsistency or semantic inconsistency in a second half output process of the network, and finally improving image quality after optimization. In the embodiments of this application, the quantity and the sizes of the convolutional layers included in the downsampling layer 801 and the upsampling layer 803 may be set according to an actual requirement. For example, if the downsampling layer 801 sequentially includes two convolutional layers with sizes of 512×512 and 256×256 from front to back, the upsampling layer 803 may include two convolutional layers with sizes of 256×256 and 512×512 from front to back.

Figure 9:
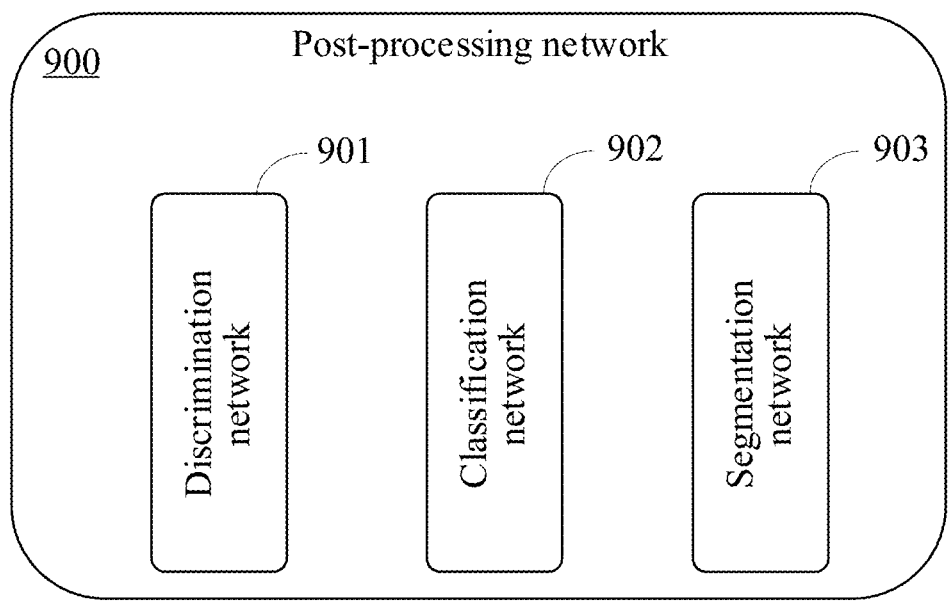
FIG. 9 is a schematic structural diagram of a post-processing network according to an embodiment of this application.

FIG. 9 is a schematic structural diagram of a post-processing network. As shown in FIG. 9, the post-processing network 900 includes a discrimination network 901, a classification network 902, and a segmentation network 903. The discrimination network 901 may include a plurality of convolutional layers, used for performing the feature extraction on the target image and the generated image, and determining confidence of the target image and the generated image. The classification network 902 may be specifically a network used for classifying, such as a VGG, and performing the feature extraction on the target image and the generated image to obtain a corresponding classification result. Consistency of deep semantics of the image can be ensured by using the classification network 902. The segmentation network 903 may be a commonly used segmentation network used for segmenting the target image, and determining image information corresponding to position information of the same object in the target image and the generated image according to the position information of each object in the target image. For example, a human face image is segmented to obtain position information of facial features in the human face image, and determine image information corresponding to the position information of the facial features in the target image and the generated image according to the position information of the facial features. Consistency of pixels of the image can be ensured through the segmentation network 903. Through the interaction of the discrimination network 901, the classification network 902, and the segmentation network 903, the generated image can be closer to the target image, and performance of the generation network is improved.

In an embodiment of this application, a joint loss function may be constructed according to the processing result of the target image and the generated image. A parameter of the to-be-trained generative adversarial deep neural network model may be reversely adjusted based on the joint loss function. After a plurality of times of iterative training, a generative adversarial deep neural network model with a converged loss function and stable performance can be obtained, and a generation network for optimizing the low-quality to-be-optimized image can be further obtained.

In an embodiment of this application, when the joint loss function is constructed, a loss function may be constructed respectively through the discrimination network, the classification network, and the segmentation network. Specifically, the generated image and the target image in the target image pair may be inputted to the discrimination network, to obtain a first discrimination result and a second discrimination result, and a first loss function is constructed according to the first discrimination result and the second discrimination result. The generated image and the target image in the target image pair are inputted to the classification network, to obtain first image information and second image information, and a second loss function is constructed according to the first image information and the second image information. The generated image and the target image in the target image pair are inputted to the segmentation network, to obtain first partial image information and second partial image information, and a third loss function is constructed according to the first partial image information and the second partial image information. Finally, the joint loss function is constructed according to the first loss function, the second loss function, and the third loss function.

In an embodiment of this application, a generation network G is used for optimizing the low-quality image (the inputted image), and outputting the optimized image as a generated image. A discrimination network D receives the generated image and the target image corresponding to the low-quality image (the inputted image), and discriminates whether an image (including the target image and the generated image) is true or false. Simultaneously, the training objective of the discrimination network D is to discriminate the target image as true, and to discriminate the generated image as false. The training objective of the generation network G is to optimize the low-quality image (the inputted image) to obtain a generated image that makes the discrimination result of the discrimination network true, that is, enables the generated image to be closer to the target image, to achieve an effect of falsehood. Therefore, the first loss function includes a discriminator loss function and a generator loss function.

In an embodiment of this application, the discrimination network D generates a first discrimination result $D(G(z^i))$ according to the generated image, and generates a second discrimination result $D(x^i)$ according to the target image, where $z^i$ is data of the low-quality image inputted to the generation network, $G(z^i)$ is data of the generated image outputted after the generation network optimizes the low-quality image, $x^i$ is data of the target image corresponding to the low-quality image, $D(G(z^i))$ and $D(x^i)$ are binary classification confidence of the generated image or the target image outputted by the discrimination network. Further, the discriminator loss function LossD and the generator loss function LossG may be defined as shown in formulas (5) and (6), respectively:

$$LossD = -\frac{1}{m}\sum_{i=1}^{m}[\log D(x^i) + \log(1 - D(G(z^i)))] \quad (5)$$

$$LossG = -\frac{1}{m}\sum_{i=1}^{m}[\log(D(G(z^i)))] \quad (6)$$

$x^i$ is data of the target image corresponding to the low-quality image, $z^i$ is data of the low-quality image inputted to the generation network, i is any low-quality image pair, and m is a total quantity of low-quality image pairs.

When the parameter of the to-be-trained generative adversarial deep neural network model is optimized according to the first loss function, a parameter of the generation network may be fixed first. A parameter of the discrimination network may be optimized according to formula (5), so that discrimination accuracy of the discrimination network reaches a preset threshold. Then, the optimized parameter of the discrimination network is fixed. The parameter of the generation network is optimized according to formula (6), so that the generation network can generate a clear optimized image.

In an embodiment of this application, the generated image and the target image need to be close in terms of a low-level pixel value and a high-level abstract feature. Therefore, to ensure are consistency of the generated image and the target image in deep semantics, the generated image and the target image may further be compared through the classification network. A perceptual loss function is constructed according to the comparison result. The parameters of the classification network and the generation network are further optimized based on the perceptual loss function. The first image information may be obtained by the classification network processing the generated image. The second image information may be obtained by the classification network processing the target image. The second loss function, that is, the perceptual loss function can be determined according to the first image information and the second image information corresponding to each low-quality image pair. The determining a second loss function according to the first image information and the second image information corresponding to each low-quality image pair may be specifically subtracting the first image information and the second image information corresponding to each low-quality image pair, to obtain an image information difference; and constructing the second loss function according to the corresponding image information differences of all the low-quality image pairs. An expression of the second loss function is shown in formula (7):

$$Loss_{perceptual} = \frac{1}{m}\sum_{i=1}^{m}(V(G(z^i)) - V(x^i)) \quad (7)$$

$x^i$ is data of the target image corresponding to the low-quality image, $z^i$ is data of the low-quality image inputted to the generation network, $G(z^i)$ is the data of the outputted generated image after the generation network processes the low-quality image, $V(G(z^i))$ is the first image information, $V(x^i)$ is the second image information, i is any low-quality image pair, and m is a total quantity of low-quality image pairs.

After the second loss function is determined, the parameter of the generation network may be optimized based on the second loss function, so that the generated image outputted by the generation network is close to or the same as the target image.

In an embodiment of this application, to further enable the generated image and the target image to be close or the same, the image information corresponding to the same object in the generated image and the target image may be compared. If image information corresponding to the same object in the generated image and the target image is similar or the same, indicating that the generated image is similar to or the same as the target image. In the embodiments of this application, the target image may be segmented through the segmentation network, to obtain the position information of each object in the image. Specifically, for a human face image, the segmentation network may be used to segment the human face image to obtain position information of segmented regions of facial features, including position information of left and right eyes, position information of the nose, and position information of the mouth. Next, image information of corresponding regions may be determined from the target image and the generated image according to the position information of the segmented regions of the facial features. Specifically, the image information corresponding to the position information of each object in the generated image may be used as the first partial image information, and the image information corresponding to the position information of each object in the target image is used as the second partial image information. Finally, an L1 norm between the first partial image information and the second partial image information is calculated. That is, a sum of absolute values of the image information corresponding to the same object is calculated. The third loss function is constructed according to the L1 norms corresponding to all the low-quality image pairs. An expression of the third loss function is shown in formula (8):

$$Loss_{mask} = \frac{1}{m}\sum_{i=1}^{m}\left(L1(G(z^i)\odot M,\ x^i\odot M)\right) \qquad (8)$$

$x^i$ is data of the target image corresponding to the low-quality image, $z^i$ is data of the low-quality image inputted to the generation network, $G(z^i)$ is data of the outputted generated image after the generation network processes the low-quality image, M is position information of each segmented object region, i is any low-quality image pair, and m is a total quantity of low-quality image pairs.

In an embodiment of this application, a plurality of low-quality image pairs may be regarded as a batch of training samples. According to the training samples, a plurality of rounds of iterative training may be performed on the to-be-trained generative adversarial deep neural network model, until a preset quantity of times of training are completed or each loss function tends to converge. During each round of training, the parameter of the model may be optimized through the first loss function, the second loss function, and the third loss function in sequence.

Figure 10:
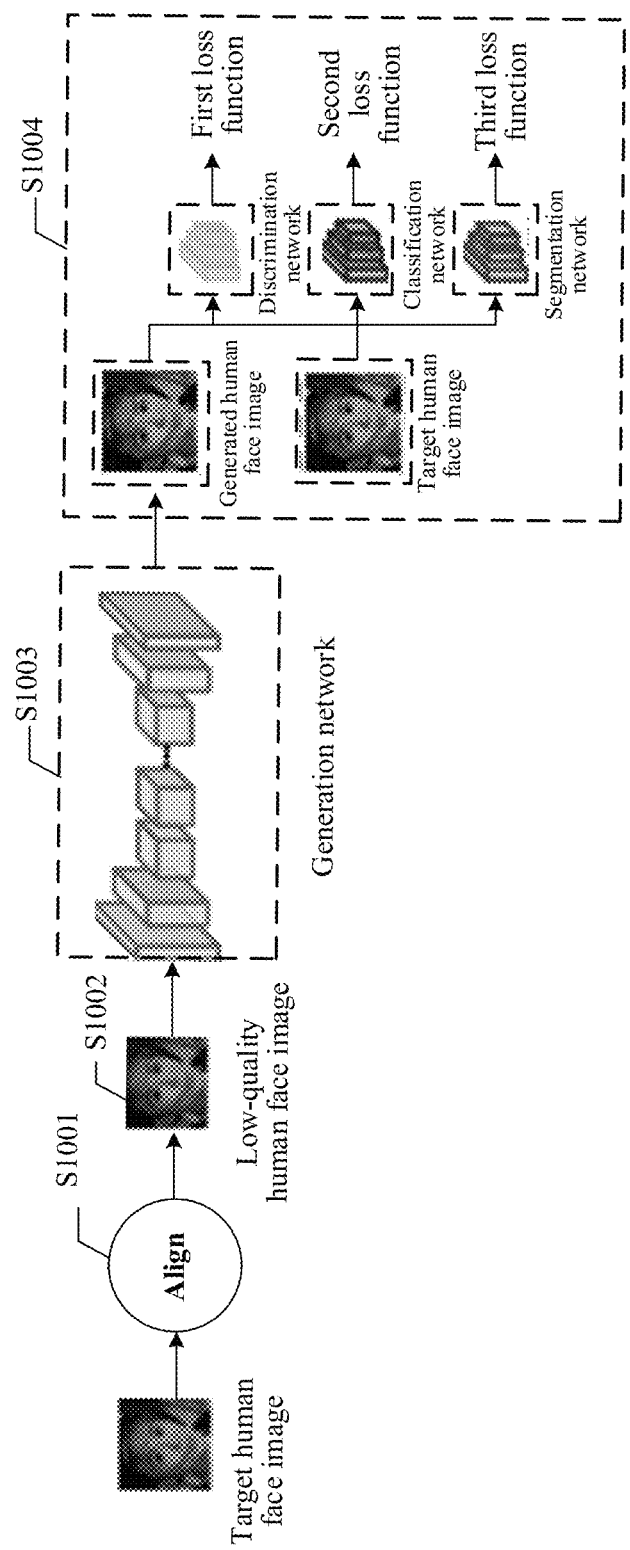
FIG. 10 is a general flowchart of training a to-be-trained generative adversarial deep neural network model according to a human face image according to an embodiment of this application.

In an embodiment of this application, a human face image is used as an example. FIG. 10 is a general flowchart of training a to-be-trained generative adversarial deep neural network model according to a human face image. In this case, the target image is a target human face image, and the low-quality image is a low-quality human face image. As shown in FIG. 10, in S1001, after the target human face image is obtained, the target human face image is aligned to obtain an aligned target human face image. In S1002, noise addition and/or blurring is performed on the aligned target human face image to obtain the low-quality human face image. In S1003, the low-quality human face image is inputted to the generation network, and processed by the generation network to output a generated human face image. The generated human face image is a human face image obtained after the low-quality human face image is optimized. In S1004, the generated human face image and the target human face image are paired, and inputted to the discrimination network, the classification network, and the segmentation network in the post-processing network respectively. The feature extraction is performed on the generated human face image and the target human face image through each network to determine a joint loss function. The joint loss function includes a first loss function, a second loss function, and a third loss function corresponding to each network. Further, the parameter of the to-be-trained generative adversarial deep neural network model is optimized according to the first loss function, the second loss function, and the third loss function, until the generated human face image is close to the target human face image. The generation network in the trained generative adversarial deep neural network model may be used for optimizing another to-be-optimized human face image after alignment to obtain a clear human face image without noise and with facial details, thereby further improving user experience.

In an embodiment of this application, after the optimized image outputted by the generation network is obtained, whether to perform position resetting on the optimized image may be determined according to an inclination angle of the human face in the to-be-optimized image relative to the standard frontal human face position. For example, when the inclination angle of the human face in the to-be-optimized image relative to the standard frontal human face position is relatively small (the difference is not obvious in terms of a visual effect), no processing is required for the to-be-optimized image. When the inclination angle of the human face in the to-be-optimized image relative to the standard frontal human face position is relatively large (the difference is relatively obvious in terms of a visual effect), the position resetting is performed on the to-be-optimized image. For example, each object in the to-be-optimized image may be restored to the original position and angle according to an inverse operation of the transformation matrix used in the alignment, and finally an optimized image corresponding to the original to-be-optimized image is obtained.

Figure 11A:
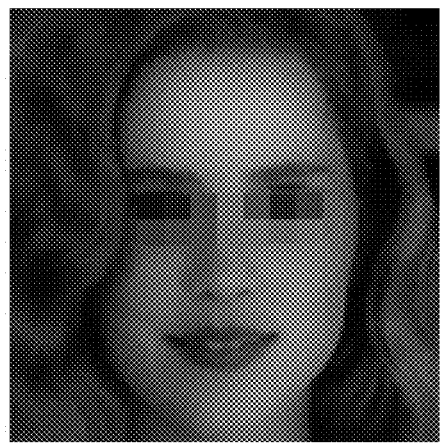
FIGS. 11A to 11F are schematic diagrams of three interfaces of using a trained generation network to optimize human face images according to an embodiment of this application.
Figure 11B:
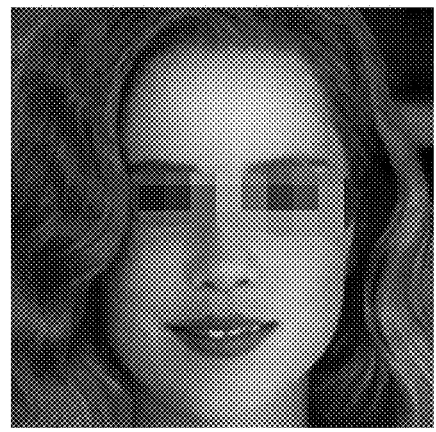
Figure 11C:
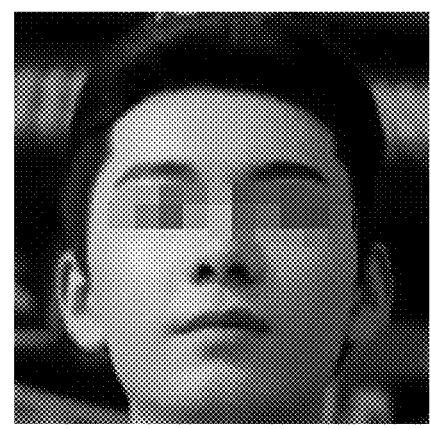
Figure 11D:
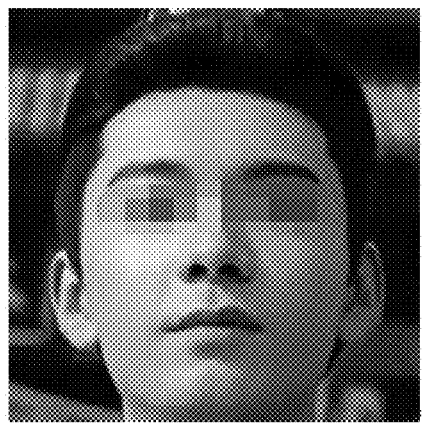
Figure 11E:
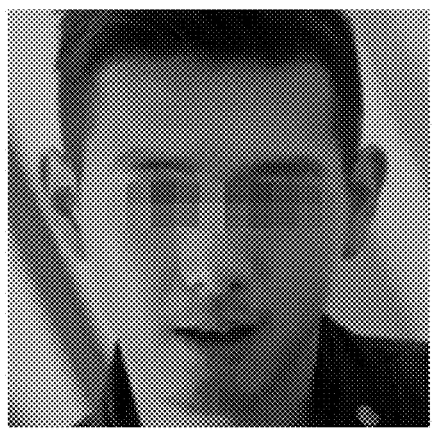
Figure 11F:
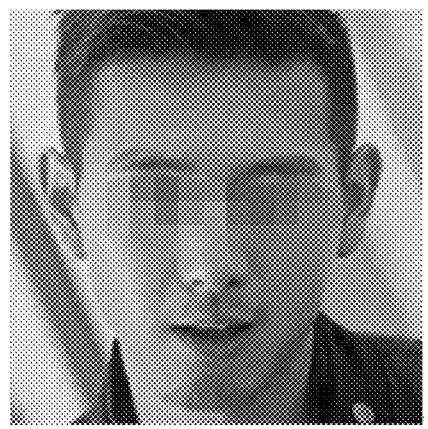

In an embodiment of this application, FIG. 11A, FIG. 11B, FIG. 11C, FIG. 11D, FIG. 11E, and FIG. 11F are schematic diagrams of three interfaces of using a trained generation network to optimize human face images. As shown in FIG. 11A, FIG. 11C, and FIG. 11E, the to-be-optimized human face images are displayed. It may be seen that the to-be-optimized human face images have high noise, low definition, and a blurred edge contour. After the to-be-optimized human face images are aligned through the generation network, human face images with high definition, a clear edge contour, and rich facial details may be obtained, as shown in the images shown in FIG. 11B, FIG. 11D, and FIG. 11F respectively.

According to the image optimization method provided in this application, the image after the optimization (that is, the optimized image) has characteristics of high definition, including image details, and accurate noise removal based on retaining features of the original image. The target images used in the model training are all high-definition images. Therefore, when the to-be-optimized image is optimized according to the trained generation network, edge contour information can be deepened and a missing part in the image can be supplemented to some extent. That is, the image optimization method in this application further has certain image completion and restoration capabilities. In addition, the image optimization method of this application is performed based on the generative adversarial deep neural network model, thereby taking less time to optimize the image, and providing characteristics of high scalability and good portability.

A person skilled in the art may understand that all or some of the steps of the foregoing implementations are implemented as computer programs executed by a processor (including a CPU and a GPU). For example, the training of the foregoing generative adversarial deep neural network model is implemented by the GPU, or based on the trained generative adversarial deep neural network model, the CPU or the GPU is used for implementing the optimization of the to-be-optimized image. When the computer programs are executed by the processor, the foregoing functions defined by the foregoing methods provided in this application are implemented. The programs may be stored in a computer-readable storage medium. The storage medium may be a read-only memory, a magnetic disk, an optical disc, or the like.

In addition, the foregoing accompanying drawings are merely schematic descriptions of processing included in the methods of exemplary implementations in this application, and are not intended for limitation. It is easily understood that the processes illustrated in the foregoing accompanying drawings do not indicate or define the chronological order of the processes. In addition, it is also easily understood that these processes may be performed, for example, synchronously or asynchronously in a plurality of modules.

The following describes embodiments of the image optimization apparatus of this application, and the apparatus embodiments can be used for performing the foregoing image optimization method of this application.

Figure 12:
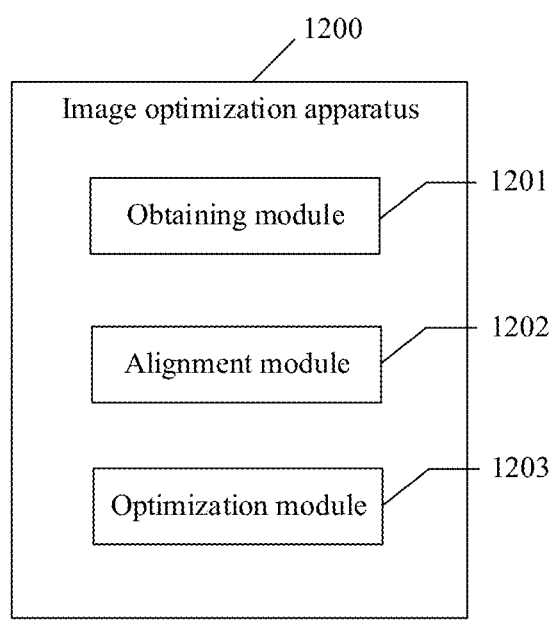
FIG. 12 is a schematic structural diagram of an image optimization apparatus according to an embodiment of this application.

FIG. 12 is a schematic structural diagram of an image optimization apparatus according to an exemplary embodiment of this application. As shown in FIG. 12, the image optimization apparatus 1200 includes: an obtaining module 1202, an alignment module 1202, and an optimization module 1203.

The obtaining module 1201 is configured to obtain a to-be-optimized image. The alignment module 1202 is configured to align the to-be-optimized image to obtain a to-be-optimized aligned image, points of objects in a target region of the to-be-optimized aligned image being distributed in a standard position. The optimization module 1203 is configured to input the to-be-optimized aligned image to a generation network, and perform feature extraction on the to-be-optimized aligned image through the generation network, to obtain an optimized image. The generation network is obtained by training a to-be-trained generative adversarial deep neural network model according to a low-quality image pair and a joint loss function. The low-quality image pair includes a target image and a low-quality image corresponding to the target image.

In an embodiment of this application, a standard position template is a point distribution of each object in a specific region. The alignment module 1201 is configured to: detect a target region in the to-be-optimized image, the target region and the specific region being of the same type; determine a transformation matrix between image data of the target region and the standard position template; and transform an image corresponding to the target region according to the transformation matrix, to obtain the to-be-optimized aligned image.

In some embodiments of this application, the alignment module is configured to align the to-be-optimized image according to a standard position template, to obtain the to-be-optimized aligned image.

In some embodiments of this application, the standard position template is a point distribution of each object in a specific region. Based on the foregoing solutions, the alignment module is configured to: detect a target region in the to-be-optimized image, the target region and the specific region being of the same type; determine a transformation matrix between image data of the target region and the standard position template; and transform an image corresponding to the target region according to the transformation matrix, to obtain the to-be-optimized aligned image.

In an embodiment of this application, the image optimization apparatus 1200 further includes: a low-quality image pair obtaining module, configured to obtaining a plurality of the low-quality image pairs; a generated image obtaining module, configured to: use each low-quality image pair as a target image pair respectively, and input a low-quality image in the target image pair to a generation network in the to-be-trained generative adversarial deep neural network model, to obtain a generated image; a loss function constructing module, configured to: input the generated image and a target image in the target image pair to a post-processing network in the to-be-trained generative adversarial deep neural network model, and process the generated image and the target image in the target image pair through the post-processing network, to construct the joint loss function; and a model parameter adjustment module, configured to optimize a parameter of the to-be-trained generative adversarial deep neural network model according to the joint loss function, to obtain the generation network.

In an embodiment of this application, the low-quality image pair obtaining module is configured to: obtain a plurality of target images, and align the plurality of target images respectively to obtain a plurality of aligned images; perform low-quality processing (e.g., image processing to reduce image quality) on the plurality of aligned images respectively, to obtain a low-quality image corresponding to each target image respectively; and form the low-quality image pair according to the target image and the low-quality image corresponding to the target image.

In some embodiments of this application, the low-quality processing includes noise addition and/or blurring.

In an embodiment of this application, the noise addition includes adding one or more of Gaussian noise, Poisson noise, and salt-and-pepper noise. The blurring includes one or more of mean filtering, Gaussian filtering, median filtering, bilateral filtering, and resolution reduction.

In an embodiment of this application, the post-processing network includes a discrimination network, a classification network, and a segmentation network. The loss function constructing module includes: a first loss function constructing unit, configured to: input the generated image and the target image in the target image pair to the discrimination network, to obtain a first discrimination result and a second discrimination result, and construct a first loss function according to the first discrimination result and the second discrimination result; a second loss function constructing unit, configured to input the generated image and the target image in the target image pair to the classification network, to obtain first image information and second image information, and construct a second loss function according to the first image information and the second image information; a third loss function constructing unit, configured to input the generated image and the target image in the target image pair to the segmentation network, to obtain first partial image information and second partial image information, and construct a third loss function according to the first partial image information and the second partial image information; and a joint loss function constructing unit, configured to construct the joint loss function according to the first loss function, the second loss function, and the third loss function.

In an embodiment of this application, the second loss function constructing unit is configured to: subtract the first image information and the second image information corresponding to each low-quality image pair, to obtain an image information difference; and construct the second loss function according to the image information differences corresponding to all the low-quality image pairs.

In an embodiment of this application, the target image in the target image pair and the generated image both includes a plurality of objects. Based on the foregoing solutions, the third loss function constructing unit is configured to: segment the target image through the segmentation network, to obtain position information of each object in the target image; and use image information corresponding to the position information of each object in the generated image as the first partial image information, and use image information corresponding to the position information of each object in the target image as the second partial image information.

In an embodiment of this application, the third loss function constructing unit is configured to: calculate an L1 norm between the first partial image information and the second partial image information; and construct the third loss function according to the L1 norms corresponding to all the low-quality image pairs.

In an embodiment of this application, the model parameter adjustment module is configured to: optimize the parameter of the to-be-trained generative adversarial deep neural network model through the first loss function, the second loss function, and the third loss function in sequence during each round of training, to obtain the generation network.

In an embodiment of this application, the optimizing the parameter of the to-be-trained generative adversarial deep neural network model through the first loss function includes: fixing a parameter of the generation network, and optimizing a parameter of the discrimination network according to the first discrimination result and the second discrimination result; and fixing the optimized parameter of the discrimination network, and optimizing the parameter of the generation network according to the first discrimination result.

In an embodiment of this application, the generation network includes a downsampling layer, a residual network layer, and an upsampling layer.

Specific details of the units in the image optimization apparatus have been specifically described in the corresponding image optimization method. Therefore, details are not described herein again.

Figure 13A:
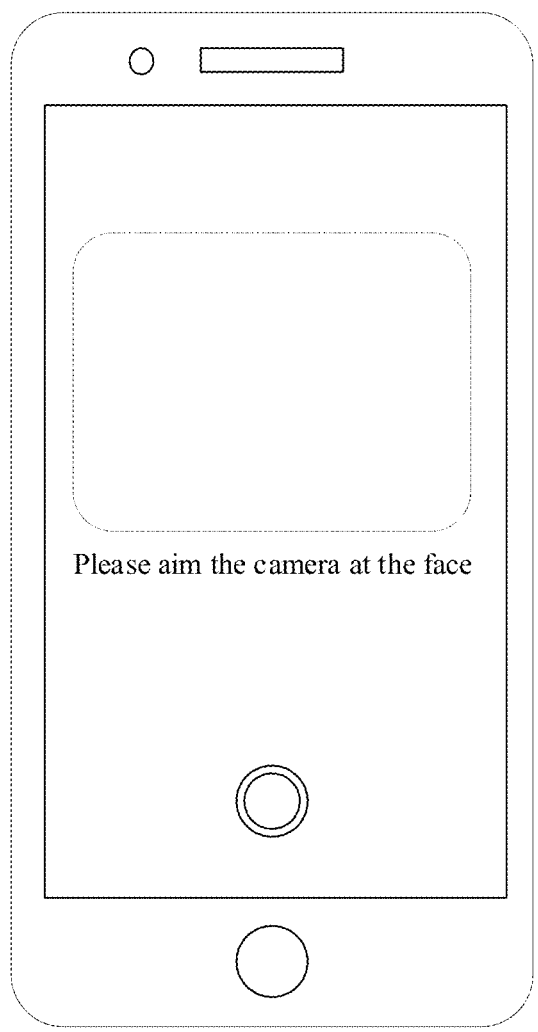
FIGS. 13A to 13D are schematic diagrams of an interface of optimizing a low-quality image according to an embodiment of this application.
Figure 13B:
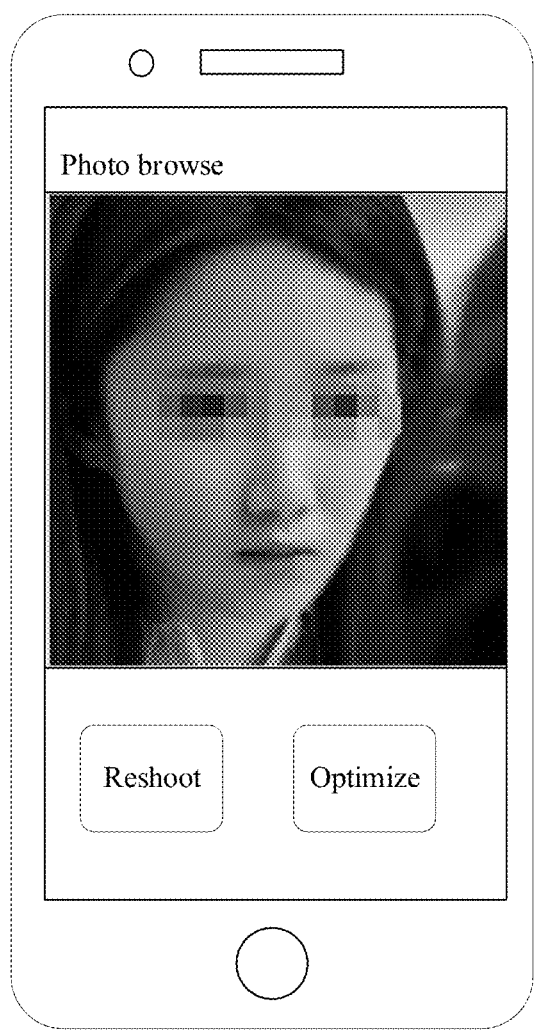
Figure 13C:
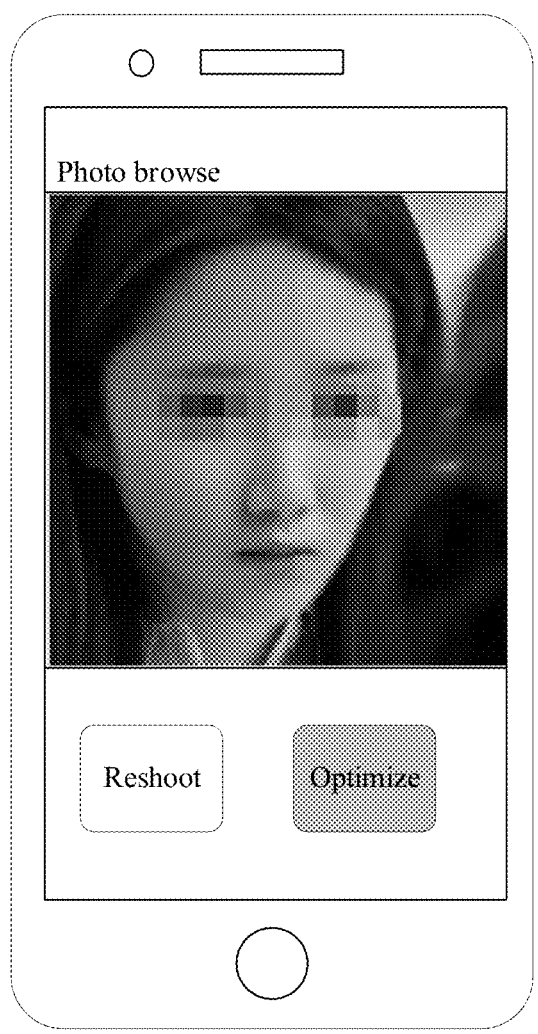
Figure 13D:

In an embodiment of this application, the image optimization apparatus may be configured in a terminal device or a sever. When a user requests to optimize a chosen low-quality image through the terminal device, the image optimization method in the foregoing embodiment may be performed to obtain an optimized image. FIG. 13A, FIG. 13B, FIG. 13C, and FIG. 13D are schematic diagrams of an interface of optimizing a low-quality image. As shown in FIG. 13A, the user can turn on a camera function in the terminal device. The interface may display an instruction (e.g., "Please aim the camera at the face") to the user to take a photo of the target human face. Then, the target human face is shot to obtain a low-quality human face image. The low-quality human face image is displayed on a photo browsing interface, as shown in FIG. 13B; The photo browsing interface shown in FIG. 13B includes a "Reshoot" button and an "Optimize" button. When the user chooses to reshoot through the "Reshoot" button, the user may reshoot to obtain a low-quality human face image. When the user chooses to optimize the low-quality human face image obtained by shooting in the photo browsing interface through the "Optimize" button, the low-quality human face image can be optimized. After "Optimize", is chosen, the color of the "Optimize" button can be changed, as shown in FIG. 13C, changed to gray. Then, an image optimization service is invoked to optimize the low-quality human face image shot by the user. The obtained optimized image is returned to an optimized photo browsing interface, as shown in FIG. 13D. The user may further choose a shot image or a downloaded image from a photo album for optimization. A specific processing procedure is the same as the image optimization procedure in the foregoing embodiment. Details are not described herein again.

Figure 14:
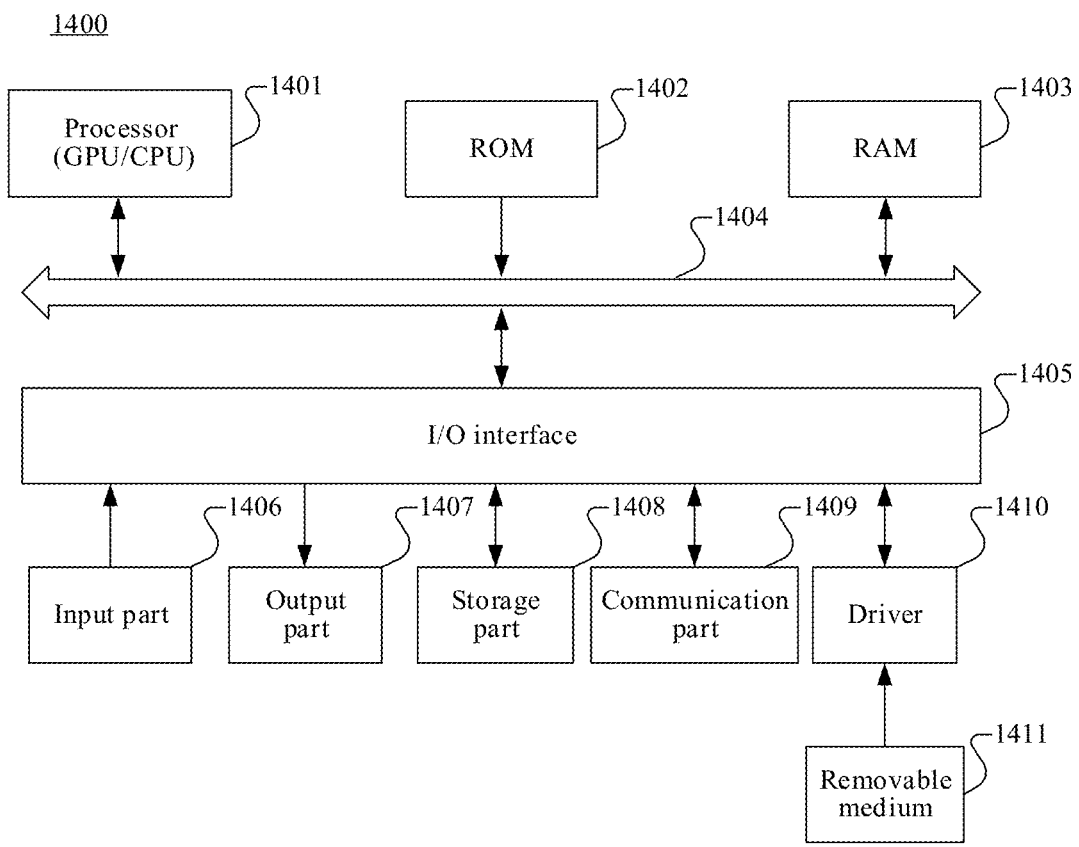
FIG. 14 is a schematic structural diagram of an electronic device according to an embodiment of this application.

FIG. 14 is a schematic structural diagram of a computer system adapted to implement an electronic device according to an embodiment of this application.

The computer system 1400 of the electronic device shown in FIG. 14 is merely an example, and does not constitute any limitation on functions and use ranges of the embodiments of this application.

As shown in FIG. 14, the computer system 1400 includes a processor 1401. The processor 1401 may include a graphics processing unit (GPU), and a central processing unit (CPU), which may perform various proper actions and processing based on a program stored in a read-only memory (ROM) 1402 or a program loaded from a storage part 1408 into a random access memory (RAM) 1403. The RAM 1403 further stores various programs and data required for operating the system. The processor (GPU/CPU) 1401, the ROM 1402, and the RAM 1403 are connected to each other through a bus 1404. An input/output (I/O) interface 1405 is also connected to the bus 1404.

The computer system 1400 may further an input part 1406, an output part 1407, a communication part 1409, a driver 1410, and a removable medium 1411.

Particularly, according to the embodiments of this application, the processes described below with reference to the flowchart may be implemented as a computer software program. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed through the communication part 1409 from a network, and/or installed from the removable medium 1411. When the computer program is executed by the processor (GPU/CPU) 1401, the various functions defined in the system of this application are executed. In some embodiments, the computer system 1400 may further include an artificial intelligence (AI) processor. The AI processor is configured to process a calculation operation related to machine learning.

The computer-readable medium shown in the embodiments of this application may be a computer-readable signal medium or a non-transitory computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

A related unit described in the embodiments of this application may be implemented in a software manner, or may be implemented in a hardware manner, and the unit described may also be set in a processor. Names of the units do not constitute a limitation on the units in a specific case.

In another aspect, this application further provides a non-transitory computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs neural network training and/or image optimization. In practical application, the foregoing functions may be allocated to and completed by different functional modules according to requirements, that is, an inner structure of a device is divided into different functional modules to implement all or a part of the functions described above.

What is claimed is:

1. An image optimization method, performed by a computing device, the method comprising:
   obtaining a to-be-optimized image;
   aligning the to-be-optimized image according to a standard position template including a point distribution of each object in a specific region to obtain a to-be-optimized aligned image, the to-be-optimized aligned image including a target region having points of objects that are distributed in a standard position; and
   using the to-be-optimized aligned image as an input to a generation network;
   performing feature extraction on the to-be-optimized aligned image using the generation network, to obtain an optimized image, wherein:
   the generation network is obtained by training a to-be-trained generative adversarial deep neural network model by:
   obtaining a plurality of target images:
   aligning the plurality of target images respectively to obtain a plurality of aligned target images;
   performing image processing on the plurality of aligned target images, to obtain a plurality of low-quality images;
   generate a plurality of low-quality image pairs from the plurality of target images and the plurality of target images, each low-quality image pair including a target image and a low-quality image corresponding to the target image;
   inputting the low-quality image in each low-quality image pair to a generation network in the to-be-trained generative adversarial deep neural network model, to obtain a generated image;
   using the generated image and the target image in the low-quality image pair as inputs to a post-processing network in the to-be-trained generative adversarial deep neural network model;
   processing the generated image and the target image in the low-quality image pair through the post-processing network, to construct a joint loss function; and
   optimizing a plurality of parameters of the to-be-trained generative adversarial deep neural network model according to the joint loss function, to obtain the generation network.

2. The method according to claim 1, wherein:
   aligning the to-be-optimized image according to the standard position template, to obtain the to-be-optimized aligned image comprises:
   detecting a target region in the to-be-optimized image, the target region and the specific region are of the same type;
   determining a transformation matrix between image data of the target region and the standard position template; and
   transforming an image corresponding to the target region according to the transformation matrix, to obtain the to-be-optimized aligned image.

3. The method according to claim 1, wherein the image processing comprising noise addition and/or blurring.

4. The method according to claim 3, wherein the noise addition comprises adding one or more of Gaussian noise, Poisson noise, and salt-and-pepper noise, and the blurring comprises one or more of mean filtering, Gaussian filtering, median filtering, bilateral filtering, and resolution reduction.

5. The method according to claim 1, wherein the post-processing network comprises a discrimination network, a classification network, and a segmentation network, and the processing the generated image and the target image in the low-quality image pair through the post-processing network, to construct the joint loss function comprises:
using the generated image and the target image in the target low-quality image pair as inputs to the discrimination network, to obtain a first discrimination result and a second discrimination result, and constructing a first loss function according to the first discrimination result and the second discrimination result;
using the generated image and the target image in the low-quality image pair as inputs for the classification network, to obtain first image information and second image information, and constructing a second loss function according to the first image information and the second image information;
using the generated image and the target image in the low-quality image pair as inputs to the segmentation network, to obtain first partial image information and second partial image information, and constructing a third loss function according to the first partial image information and the second partial image information; and
constructing the joint loss function according to the first loss function, the second loss function, and the third loss function.

6. The method according to claim 5, wherein constructing the second loss function according to the first image information and the second image information comprises:
subtracting the first image information and the second image information corresponding to each low-quality image pair, to obtain an image information difference; and
constructing the second loss function according to the image information differences corresponding to all the low-quality image pairs.

7. The method according to claim 5, wherein both the target image in the low-quality image pair and the generated image comprise a plurality of objects; and
using the generated image and the target image in the low-quality image pair as inputs to the segmentation network, to obtain first partial image information and second partial image information comprises:
segmenting the target image through the segmentation network, to obtain position information of each object in the target image; and
using image information corresponding to the position information of each object in the generated image as the first partial image information, and using image information corresponding to the position information of each object in the target image as the second partial image information.

8. The method according to claim 7, wherein the constructing a third loss function according to the first partial image information and the second partial image information comprises:
calculating an L1 norm between the first partial image information and the second partial image information; and constructing the third loss function according to the L1 norms corresponding to all the low-quality image pairs.

9. The method according to claim 5, wherein optimizing a parameter of the to-be-trained generative adversarial deep neural network model according to the joint loss function, to obtain the generation network comprises:
optimizing the parameter of the to-be-trained generative adversarial deep neural network model through the first loss function, the second loss function, and the third loss function in sequence during each round of training, to obtain the generation network.

10. The method according to claim 9, wherein the optimizing the parameter of the to-be-trained generative adversarial deep neural network model through the first loss function comprises:
fixing a parameter of the generation network, and optimizing a parameter of the discrimination network according to the first discrimination result and the second discrimination result; and
fixing the optimized parameter of the discrimination network, and optimizing the parameter of the generation network according to the first discrimination result.

11. A computing device, comprising:
one or more processors; and
memory storing one or more programs, the one or more programs comprising instructions that, when executed by the one or more processors, cause the one or more processors to perform operations comprising:
obtaining a to-be-optimized image;
aligning the to-be-optimized image according to a standard position template including a point distribution of each object in a specific region to obtain a to-be-optimized aligned image, the to-be-optimized aligned image including a target region having points of objects that are distributed in a standard position; and
using the to-be-optimized aligned image as an input to a generation network;
performing feature extraction on the to-be-optimized aligned image using the generation network, to obtain an optimized image, wherein:
the generation network is obtained by training a to-be-trained generative adversarial deep neural network model by:
obtaining a plurality of target images;
aligning the plurality of target images respectively to obtain a plurality of aligned target images;
performing image processing on the plurality of aligned target images, to obtain a plurality of low-quality images;
generate a plurality of low-quality image pairs from the plurality of target images and the plurality of target images, each low-quality image pair including a target image and a low-quality image corresponding to the target image;
inputting the low-quality image in each low-quality image pair to a generation network in the to-be-trained generative adversarial deep neural network model, to obtain a generated image;
using the generated image and the target image in the low-quality image pair as inputs to a post-processing network in the to-be-trained generative adversarial deep neural network model;
processing the generated image and the target image in the low-quality image pair through the post-processing network. to construct a joint loss function; and optimizing a plurality of parameters of the to-be-trained generative adversarial deep neural network model according to the joint loss function, to obtain the generation network.

12. The computing device according to claim 11, wherein:
aligning the to-be-optimized image according to the standard position template, to obtain the to-be-optimized aligned image comprises:
   detecting a target region in the to-be-optimized image, the target region and the specific region are of the same type;
   determining a transformation matrix between image data of the target region and the standard position template; and
   transforming an image corresponding to the target region according to the transformation matrix, to obtain the to-be-optimized aligned image.

13. The computing device according to claim 11, wherein the post-processing network comprises a discrimination network, a classification network, and a segmentation network, and the processing the generated image and the target image in the low-quality image pair through the post-processing network, to construct the joint loss function comprises:
   using the generated image and the target image in the low-quality image pair as inputs to the discrimination network, to obtain a first discrimination result and a second discrimination result, and constructing a first loss function according to the first discrimination result and the second discrimination result;
   using the generated image and the target image in the low-quality image pair as inputs for the classification network, to obtain first image information and second image information, and constructing a second loss function according to the first image information and the second image information;
   using the generated image and the target image in the low-quality image pair as inputs to the segmentation network, to obtain first partial image information and second partial image information, and constructing a third loss function according to the first partial image information and the second partial image information; and
   constructing the joint loss function according to the first loss function, the second loss function, and the third loss function.

14. The computing device according to claim 13, wherein constructing the second loss function according to the first image information and the second image information comprises:
   subtracting the first image information and the second image information corresponding to each low-quality image pair, to obtain an image information difference; and
   constructing the second loss function according to the image information differences corresponding to all the low-quality image pairs.

15. The computing device according to claim 13, wherein both the target image in the low-quality image pair and the generated image comprise a plurality of objects; and
   using the generated image and the target image in the low-quality image pair as inputs to the segmentation network, to obtain first partial image information and second partial image information comprises:
      segmenting the target image through the segmentation network, to obtain position information of each object in the target image; and
      using image information corresponding to the position information of each object in the generated image as the first partial image information, and using image information corresponding to the position information of each object in the target image as the second partial image information.

16. The computing device according to claim 15, wherein the constructing a third loss function according to the first partial image information and the second partial image information comprises:
   calculating an L1 norm between the first partial image information and the second partial image information; and
   constructing the third loss function according to the L1 norms corresponding to all the low-quality image pairs.

17. The computing device according to claim 13, wherein optimizing a parameter of the to-be-trained generative adversarial deep neural network model according to the joint loss function, to obtain the generation network comprises:
   optimizing the parameter of the to-be-trained generative adversarial deep neural network model through the first loss function, the second loss function, and the third loss function in sequence during each round of training, to obtain the generation network.

18. The computing device according to claim 17, wherein the optimizing the parameter of the to-be-trained generative adversarial deep neural network model through the first loss function comprises:
   fixing a parameter of the generation network, and optimizing a parameter of the discrimination network according to the first discrimination result and the second discrimination result; and
   fixing the optimized parameter of the discrimination network, and optimizing the parameter of the generation network according to the first discrimination result.

19. A non-transitory computer-readable storage medium, storing a computer program, the computer program, when executed by one or more processors of a computing device, cause the one or more processors to perform operations comprising:
   obtaining a to-be-optimized image;
   aligning the to-be-optimized image according to a standard position template including a point distribution of each object in a specific region to obtain a to-be-optimized aligned image, the to-be-optimized aligned image including a target region having points of objects that are distributed in a standard position; and
   using the to-be-optimized aligned image as an input to a generation network;
   performing feature extraction on the to-be-optimized aligned image using the generation network, to obtain an optimized image, wherein:
   the generation network is obtained by training a to-be-trained generative adversarial deep neural network model by:
   obtaining a plurality of target images:
   aligning the plurality of target images respectively to obtain a plurality of aligned target images;
   performing image processing on the plurality of aligned target images, to obtain a plurality of low-quality images;
   generate a plurality of low-quality image pairs from the plurality of target images and the plurality of target images, each low-quality image pair including a target image and a low-quality image corresponding to the target image;

inputting the low-quality image in each low-quality image pair to a generation network in the to-be-trained generative adversarial deep neural network model, to obtain a generated image;

using the generated image and the target image in the low-quality image pair as inputs to a post-processing network in the to-be-trained generative adversarial deep neural network model;

processing the generated image and the target image in the low-quality image pair through the post-processing network, to construct a joint loss function; and optimizing a plurality of parameters of the to-be-trained generative adversarial deep neural network model according to the joint loss function, to obtain the generation network.

20. The non-transitory computer-readable storage medium according to claim 19, wherein the post-processing network comprises a discrimination network, a classification network, and a segmentation network, and the processing the generated image and the target image in the low-quality image pair through the post-processing network, to construct the joint loss function comprises:

using the generated image and the target image in the low-quality image pair as inputs to the discrimination network, to obtain a first discrimination result and a second discrimination result, and constructing a first loss function according to the first discrimination result and the second discrimination result;

using the generated image and the target image in the low-quality image pair as inputs for the classification network, to obtain first image information and second image information, and constructing a second loss function according to the first image information and the second image information;

using the generated image and the target image in the low-quality image pair as inputs to the segmentation network, to obtain first partial image information and second partial image information, and constructing a third loss function according to the first partial image information and the second partial image information; and constructing the joint loss function according to the first loss function, the second loss function, and the third loss function.

* * * * *